US011153128B2

(12) United States Patent
Seo et al.

(10) Patent No.: US 11,153,128 B2
(45) Date of Patent: Oct. 19, 2021

(54) CSI-RS BASED CHANNEL ESTIMATING METHOD IN A WIRELESS COMMUNICATION SYSTEM AND DEVICE FOR SAME

(71) Applicant: LG ELECTRONICS INC., Seoul (KR)

(72) Inventors: Hanbyul Seo, Anyang-si (KR); Kijun Kim, Anyang-si (KR); Daewon Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/239,881

(22) Filed: Jan. 4, 2019

(65) Prior Publication Data

US 2019/0140866 A1 May 9, 2019

Related U.S. Application Data

(63) Continuation of application No. 15/654,101, filed on Jul. 19, 2017, now Pat. No. 10,200,214, which is a
(Continued)

(51) Int. Cl.
*H04L 25/02* (2006.01)
*H04L 5/00* (2006.01)
(Continued)

(52) U.S. Cl.
CPC ......... *H04L 25/0228* (2013.01); *H04B 7/024* (2013.01); *H04B 17/318* (2015.01);
(Continued)

(58) Field of Classification Search
CPC ............ H04L 25/0228; H04L 61/6022; H04L 5/0057; H04L 5/0055; H04L 5/0051;
(Continued)

(56) References Cited

U.S. PATENT DOCUMENTS

2010/0075706 A1  3/2010  Montojo et al.
2010/0323684 A1  12/2010  Cai et al.
(Continued)

FOREIGN PATENT DOCUMENTS

CN  101674655 A  3/2010
CN  101841828 A  9/2010
(Continued)

OTHER PUBLICATIONS

Nokia, "Verification of the enhanced downlink MIMO," TSG RAN WG4 meeting #57, R4-104271, Jacksonville, US, Nov. 15-19, 2010 (server date Nov. 9, 2010), 4 pages, XP050499470.
(Continued)

*Primary Examiner* — Pao Sinkantarakorn
*Assistant Examiner* — Kabir U Jahangir
(74) *Attorney, Agent, or Firm* — Birch, Stewart, Kolasch & Birch, LLP

(57) ABSTRACT

A method and user equipment for receiving channel status information-reference signals (CSI-RSs) from a base station (BS) in a wireless communication system, are discussed. The method includes receiving, through a higher layer, configuration about two or more CSI-RS; and receiving, from the BS, the CSI-RSs based on the configuration, wherein, when the configuration includes an indicator related to antenna ports of the two or more CSI-RS, the CSI-RSs are received on the assumption that the antenna ports for two or more CSI-RS resources are same.

6 Claims, 14 Drawing Sheets

Related U.S. Application Data continuation of application No. 15/099,472, filed on Apr. 14, 2016, now Pat. No. 9,742,591, which is a continuation of application No. 14/009,491, filed as application No. PCT/KR2012/003475 on May 3, 2012, now Pat. No. 9,344,299.

(60) Provisional application No. 61/500,599, filed on Jun. 23, 2011, provisional application No. 61/485,642, filed on May 13, 2011.

(51) Int. Cl.
| | |
|---|---|
| *H04B 7/024* | (2017.01) |
| *H04W 76/27* | (2018.01) |
| *H04B 17/318* | (2015.01) |
| *H04J 11/00* | (2006.01) |
| *H04L 1/18* | (2006.01) |
| *H04L 29/12* | (2006.01) |
| *H04W 64/00* | (2009.01) |
| *H04W 72/12* | (2009.01) |
| *H04B 7/0417* | (2017.01) |
| *H04W 88/02* | (2009.01) |
| *H04W 88/08* | (2009.01) |
| *H04W 88/16* | (2009.01) |

(52) U.S. Cl.
CPC .............. *H04J 11/00* (2013.01); *H04J 11/005* (2013.01); *H04L 1/1812* (2013.01); *H04L 5/0023* (2013.01); *H04L 5/0048* (2013.01); *H04L 5/0051* (2013.01); *H04L 5/0055* (2013.01); *H04L 5/0057* (2013.01); *H04L 5/0094* (2013.01); *H04L 61/6022* (2013.01); *H04W 64/003* (2013.01); *H04W 72/1268* (2013.01); *H04W 72/1273* (2013.01); *H04W 76/27* (2018.02); *H04B 7/0417* (2013.01); *H04W 88/02* (2013.01); *H04W 88/08* (2013.01); *H04W 88/16* (2013.01)

(58) Field of Classification Search
CPC ... H04L 1/1812; H04L 5/0094; H04L 5/0048; H04L 5/0023; H04W 76/27; H04W 72/1273; H04W 72/1268; H04W 64/003; H04W 88/16; H04W 88/08; H04W 88/02; H04J 11/005; H04J 11/00; H04B 17/318; H04B 7/024; H04B 7/0417
See application file for complete search history.

(56) References Cited

U.S. PATENT DOCUMENTS

| | | | |
|---|---|---|---|
| 2011/0176634 | A1 | 7/2011 | Yoon et al. |
| 2012/0020230 | A1 | 1/2012 | Chen et al. |
| 2012/0106610 | A1 | 5/2012 | Nogami et al. |
| 2012/0113852 | A1 | 5/2012 | Xu et al. |
| 2012/0155414 | A1 | 6/2012 | Noh et al. |
| 2012/0176939 | A1* | 7/2012 | Qu .................. H04L 5/0023 370/255 |
| 2012/0208541 | A1* | 8/2012 | Luo ................. H04L 5/0048 455/437 |
| 2013/0044685 | A1* | 2/2013 | Fong ............... H04J 11/0053 370/328 |
| 2013/0223332 | A1 | 8/2013 | Wu et al. |
| 2013/0294271 | A1 | 11/2013 | Nagata et al. |
| 2013/0294277 | A1 | 11/2013 | Nagata et al. |

FOREIGN PATENT DOCUMENTS

| | | |
|---|---|---|
| JP | 2011-78019 A | 4/2011 |
| JP | 2011-79019 A | 4/2011 |
| JP | 4902778 B1 | 3/2012 |
| JP | 2012-527136 A | 11/2012 |
| JP | 2014-500649 A | 1/2014 |
| JP | 2014-512713 A | 5/2014 |
| JP | 2014-514837 A | 6/2014 |
| JP | 5711277 B2 | 4/2015 |
| JP | 5902841 B2 | 4/2016 |
| JP | 5912173 B2 | 4/2016 |
| JP | 2016-105659 A | 6/2016 |
| KR | 10-2010-0110526 A | 10/2010 |
| KR | 10-2011-0030372 A | 3/2011 |
| WO | WO 2010/033869 A2 | 3/2010 |
| WO | WO 2010/106729 A1 | 9/2010 |
| WO | WO 2010/130209 A1 | 11/2010 |
| WO | WO 2010/146781 A1 | 12/2010 |
| WO | WO 2011/008519 A1 | 1/2011 |
| WO | WO 2011/013990 A2 | 2/2011 |
| WO | WO 2011/018121 A1 | 2/2011 |
| WO | WO 2011/034340 A2 | 3/2011 |
| WO | WO 2012/093554 A1 | 7/2012 |

OTHER PUBLICATIONS

Catt, "Interference Measurement over Muted RE," 3GPP TSG RAN WG1 Meeting #63bis, R1-110049, Jan. 17-21, 2011, 4 pages.
Catt, "Remaining Issue on Aperiodic CSI Reporting," 3GPP TSG RAN WG1 Meeting #64, R1-110717, Feb. 21-25, 2011, 2 pages.
CMCC, "Discussion on the CQI reporting for Rel-10," 3GPP TSG-RAN WG1#64, R1-110965, Feb. 21-25, 2011, 5 pages.
Huawei et al., "Measurement Definitions for Resource-Restricted Measurements," 3GPP TSG WG1 meeting #63bis, R1-110020, Jan. 17-21, 2011, 6 pages.
LG Electronics, "RE muting design and considerations," TSG-RAN WG1 Meeting #62, R1-104649, Aug. 23-27, 2010, 6 pages.
NTT Docomo, "Remaining issues on eICIC for Rel-10," 3GPP TSG RAN WG1 Meeting #63, R1-106184, Nov. 15-19, 2010, pp. 1-6.
Texas Instruments, "CSI reporting based on restricted measurements in Rel-10," 3GPP TSG WG1 #63bis, R1-110263, Jan. 17-21, 2011, p. 1-7.
Texas Instruments, "Signaling for CSI-RS and PDSCH Muting in Rel-10 LTE," 3GPP TSG RAN WG1 #62, R1-104469, Aug. 23-27, 2010, pp. 1-4.
Ericsson, ST-Ericsson, "Aspects on Distributed RRUs with Shared Cell-ID for Heterogeneous Deployments", 3GPP TSG-RAN WG1 #64, R1-110649, Feb. 21-Feb. 25, 2011, Taipei, Taiwan.
Ericsson, ST-Ericsson, "Discussion on CSI-RS collision avoidance", 3GPP TSG-RAN WG1 #63, R1-105882, Nov. 15-19, 2010, Jacksonville, USA.
LG Electronics, "Discussions on CSI feedback enhancement", 3GPP TSG RAN WG1 Meeting #65, R1-111788, May 9-13, 2011, Barcelona, Spain.
LG Electronics, "Remaining Issues on CSI-RS", 3GPP TSG RAN WG1 Meeting #65, R1-111702, May 9-13, 2011, Barcelona, Spain.
Renesas Electronics Europe, "On CQI reference resource", 3GPP TSG-RAN WG1 Meeting #63bis, R1-110187, Jan. 17-21, 2011, Dublin, Ireland.

\* cited by examiner

-- Prior Art --

(a) CONTROL-PLANE PROTOCOL STACK (b) USER-PLANE PROTOCOL STACK

CSI-RS BASED CHANNEL ESTIMATING METHOD IN A WIRELESS COMMUNICATION SYSTEM AND DEVICE FOR SAME

CROSS REFERENCE TO RELATED APPLICATIONS

This application is a Continuation of U.S. application Ser. No. 15/654,101, filed on Jul. 19, 2017, which is a Continuation of U.S. application Ser. No. 15/099,472 filed on Apr. 14, 2016 (now U.S. Pat. No. 9,742,591 issued on Aug. 22, 2017), which is a Continuation of U.S. application Ser. No. 14/009,491 filed on Oct. 2, 2013 (now U.S. Pat. No. 9,344,299 issued on May 17, 2016), which is the National Stage entry under U.S.C. § 371 of International Application No. PCT/KR2012/003475 filed on May 3, 2012, which claims the priority benefit of U.S. Provisional Application Nos. 61/500,599 filed on Jun. 23, 2011 and 61/485,642 filed on May 13, 2011. The entire contents of all of the above applications are hereby expressly incorporated by reference into the present application.

BACKGROUND OF THE INVENTION

Field of the Invention

The present invention relates to a wireless communication system, and more particularly, to a method of estimating a channel based on CSI-RS (channel status information-reference signal) in a wireless communication system and apparatus therefor.

Discussion of the Background Art

3GPP LTE ($3^{rd}$ generation partnership projecting long term evolution) communication system is schematically described for one example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '$3^{rd}$ Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

SUMMARY OF THE INVENTION

Based on the above-mentioned discussion, a method of estimating a channel based on CSI-RS in a wireless communication system and apparatus therefor shall be proposed in the following description.

To achieve these and other advantages and in accordance with the purpose of the present invention, as embodied and broadly described, a method of performing a measurement, which is performed by a user equipment in a wireless communication system, according to one embodiment of the present invention includes the steps of receiving a configuration information of CSI-RS (channel status information-reference signal) defined by a plurality of antenna ports from a base station, combining CSI-RSs, each of which is defined by specific antenna ports among the plurality of antenna ports, and performing the measurement based on the combined CSI-RS.

Preferably, the CSI-RSs defined by the specific antenna ports, are transmitted through a same antenna port in the base station.

Preferably, the method may further include the step of receiving information on the specific antenna ports from the base station through an upper layer. Preferably, the method may further include the step of receiving a triggering signal for performing the measurement by combining the CSI-RSs defined by the specific antenna ports, from the base station.

Preferably, the method further includes the step of reporting a channel state information to the base station using the CSI-RS defined by the plurality of antenna ports, wherein the specific antenna ports among the plurality of antenna ports are assumed as a single antenna port in calculating the channel state information. More preferably, in calculating the channel state information, a same interference amount may be assumed as existing in the specific antenna ports among the plurality of antenna ports.

To further achieve these and other advantages and in accordance with the purpose of the present invention, as embodied and broadly described, in a wireless communication system, a user equipment according to another embodiment of the present invention includes a wireless communication module configured to receive a configuration information of CSI-RS (channel status information-reference signal) defined by a plurality of antenna ports from a base station and a processor configured to combine CSI-RSs, each of which is defined by specific antenna ports among the plurality of antenna ports, the processor configured to perform the measurement based on the combined CSI-RS.

Preferably, the above-mentioned measurement measures at least one of RSRP (reference signal received power), RSRQ (reference signal received quality) and pathloss based on the combined CSI-RS.

According to an embodiment of the present invention, a user equipment in a wireless communication system can estimate a channel more efficiently using CSI-RS.

Effects obtainable from the present invention are non-limited by the above mentioned effect. And, other unmentioned effects can be clearly understood from the following description by those having ordinary skill in the technical field to which the present invention pertains.

DETAILED DESCRIPTION OF THE INVENTION

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

Figure 2:
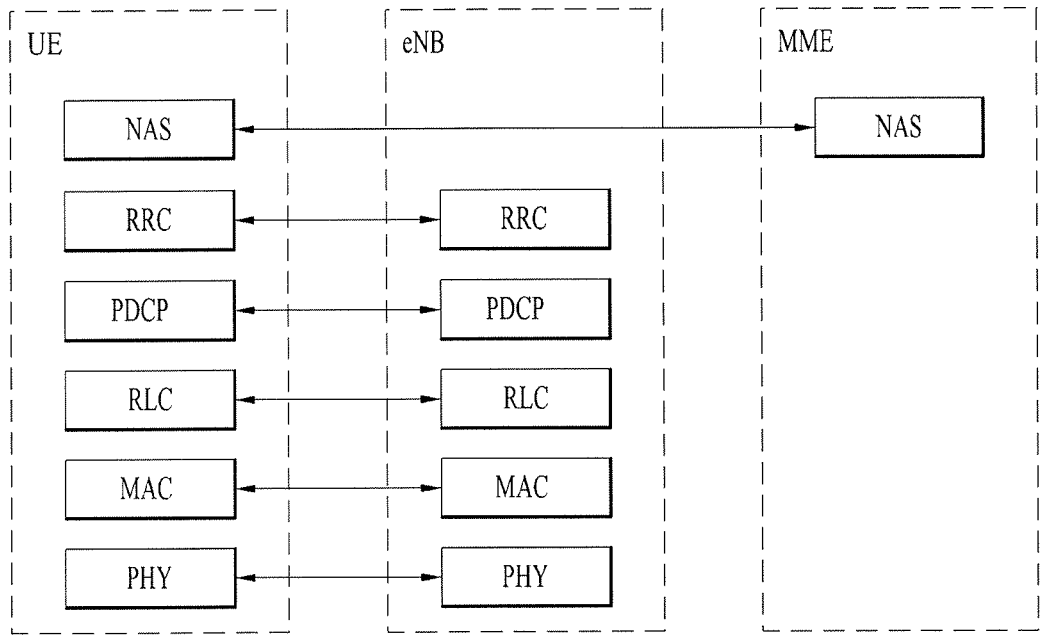
FIG. 2 is a diagram of (a) a structure of a control plane and (b) a structure of a user plane of a radio interface protocol between a user equipment and E-UTRAN based on 3GPP radio access network specification.
Figure 2:
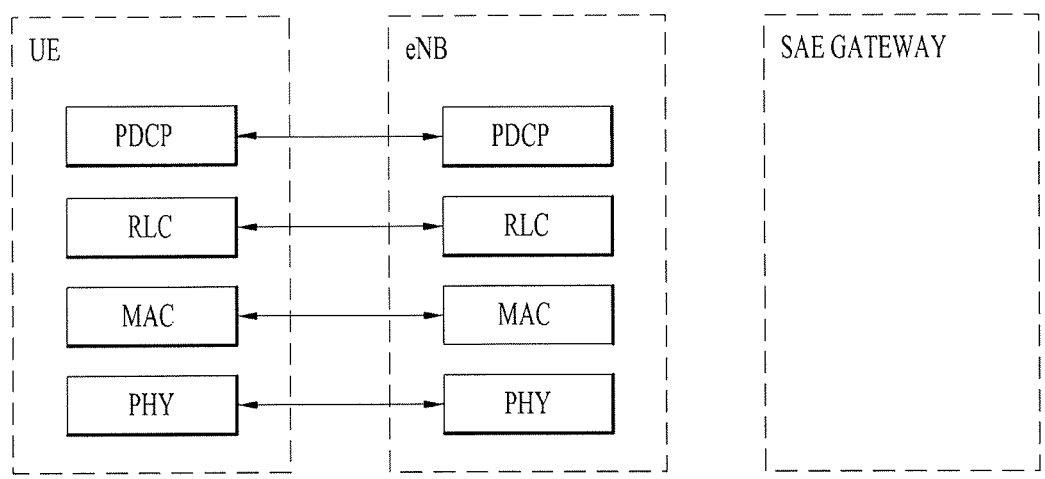

FIG. 2 is a diagram of structures of a control plane (FIG. 2(a)) and a user plane (FIG. 2(b)) of a radio interface protocol between a user equipment and E-UTRAN based on 3GPP radio access network specification. First of all, a control plane means a passage for transmitting control messages used by a user equipment and a network to manage a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer of the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network. In case that an RRC connection is established between an RRC layer of a user equipment and an RRC layer of a network, the user equipment is in a connected mode. Otherwise, the user equipment is in an idle mode. NAS (non-access stratum)

layer above an RRC layer performs a function of session management, a function of mobility management and the like.

One cell, which constructs a base station (eNB), is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH). Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 3:
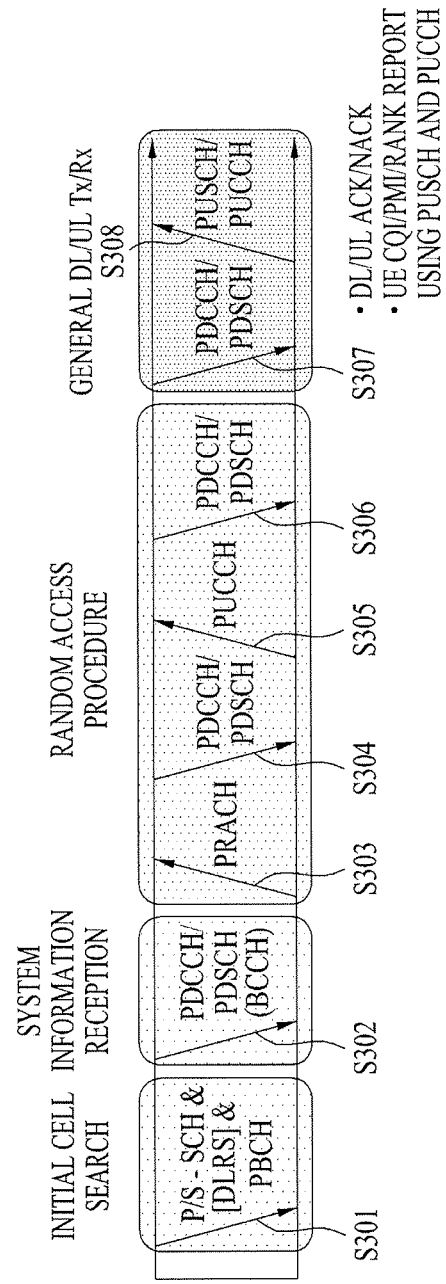
FIG. 3 is a diagram for explaining physical channels used for 3GPP system and a general method of transmitting a signal using the same.

FIG. 3 is a diagram for explaining physical channels used by 3GPP system and a general signal transmitting method using the same.

If a power of a user equipment is turned on or the user equipment enters a new cell, the user equipment performs an initial cell search for matching synchronization with a base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S302].

Meanwhile, if the user equipment initially accesses the base station or fails to have a radio resource for signal transmission, the user equipment is able to perform a random access procedure (RACH) on the base station [S303 to S306]. For this, the user equipment transmits a specific sequence as a preamble via a physical random access channel (PRACH) [S303, S305] and is then able to receive a response message via PDCCH and a corresponding PDSCH in response to the preamble [S304, S306]. In case of contention based RACH, it is able to perform a contention resolution procedure in addition.

Having performed the above mentioned procedures, the user equipment is able to perform PDCCH/PDSCH reception [S307] and PUSCH/PUCCH (physical uplink shared channel/physical uplink control channel) transmission [S308] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 4:
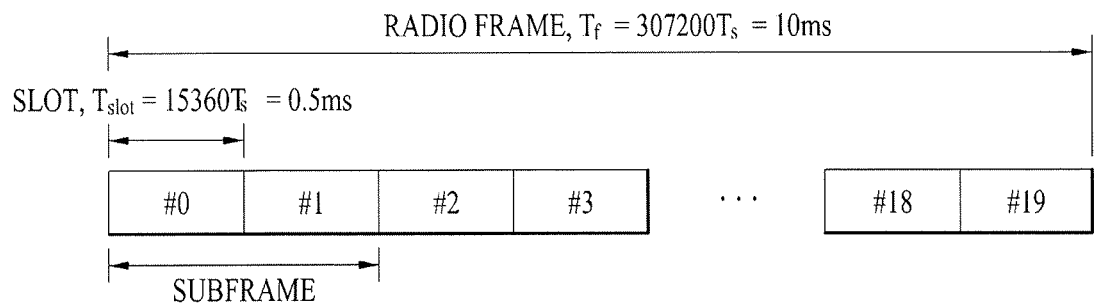
FIG. 4 is a diagram for an example of a structure of a radio frame used for LTE system.

FIG. 4 is a diagram for an example of a structure of a radio frame used by LTE system.

Referring to FIG. 4, a radio frame has a length of 10 ms ($327200 \times T_s$) and is constructed with 10 subframes in equal size. Each of the subframes has a length of 1 ms and is constructed with two slots. Each of the slots has a length of 0.5 ms ($15360 \times T_b$). In this case, $T_s$ indicates a sampling time and is expressed as $T_s = 1/(15 \text{ kHz} \times 2048) = 3.2552 \times 10^{-8}$ (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot can be modified in various ways.

Figure 5:
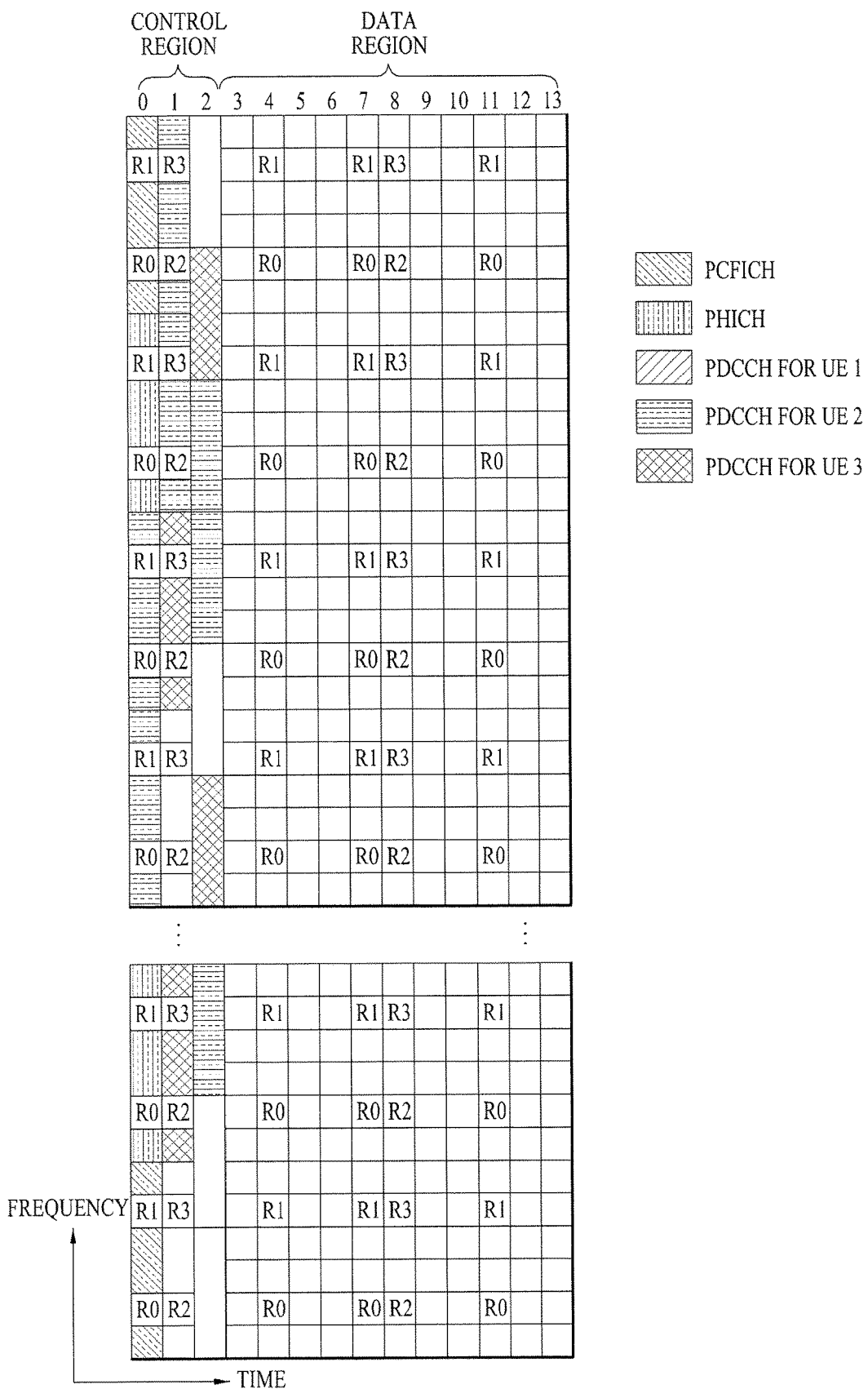
FIG. 5 is a diagram for one example of a structure of a downlink (DL) subframe used by LTE system.

FIG. 5 is a diagram for one example of a structure of a downlink (DL) subframe used by LTE system.

Referring to FIG. 5, a subframe may include 14 OFDM symbols. First 1 to 3 OFDM symbols may be used as a control region and the rest of 13 to 11 OFDM symbols may be used as a data region, in accordance with subframe configurations. In the drawing, R1 to R4 indicate reference signals (RS) for antennas 0 to 3, respectively. The RS may be fixed to a predetermined pattern in a subframe irrespective of the control region or the data region. The control region may be assigned to a resource, to which the RS is not assigned, in the control region. And, a traffic channel may be assigned to a resource, to which the RS is not assigned, in the data region. Control channels assigned to the control region may include PCFICH (Physical Control Format Indicator CHannel), PHICH (Physical Hybrid-ARQ Indicator CHannel), PDCCH (Physical Downlink Control CHannel) and the like.

The PCFICH is a physical control format indicator channel and informs a user equipment of the number of OFDM symbols used for PDCCH in each subframe. The PCFICH is situated at a first OFDM symbol and is set prior to the PHICH and the PDCCH. The PCFICH is constructed with four resource element groups (REGs). Each of the REGs is distributed within the control region based on a cell ID. One REG is constructed with four REs. In this case, the RE indicates a minimum physical resource defined as '1 subcarrier×1 OFDM symbol'. A value of the PCFICH indicates a value of '1~3' or '2~4' and is modulated by QPSK (quadrature phase shift keying).

The PHICH is a physical HARQ (hybrid-automatic repeat and request) indicator channel and is used in carrying HARQ ACK/NACK for uplink transmission. In particular, the PHICH indicates a channel for carrying DL ACK/NACK information for UL HARQ. The PHICH is constructed with 1 REG and is cell-specifically scrambled. The ACK/NACK is indicated by 1 bit and then modulated by BPSK (binary phase shift keying). The modulated ACK/NACK is spread by 'SF (spreading factor)=2 or 4'. A plurality of PHICHs mapped to the same resource configure a PHICH group. The number of the PHICHs multiplexed into the PHICH group is determined depending on the number of spreading codes. And, the PHICH (group) is repeated three times to obtain a diversity gain in frequency domain and/or time domain.

The PDCCH is a physical downlink control channel and is assigned to first n OFDM symbols of a subframe. In this case, 'n' is an integer equal to or greater than 1 and is indicated by the PCFICH. The PDCCH informs each user equipment or UE group of resource allocation information on transport channels PCH (paging channel) and DL-SCH (downlink-shared channel), uplink scheduling grant, HARQ information and the like. The PCH (paging channel) and the DL-SCH (downlink-shared channel) are carried on the PDSCH. Therefore, a base station or a user equipment normally transmits or receives data via the PDSCH except specific control information or specific service data.

Information indicating that data of the PDSCH is transmitted to a prescribed user equipment (or a plurality of user equipments), information indicating how the user equipments receive and decode PDSCH data, and the like are transmitted by being included in the PDCCH. For instance, assume that a specific PDCCH is CRC masked with RNTI (radio network temporary identity) 'A' and that information on data transmitted using a radio resource 'B' (e.g., frequency position) and transmission format information 'C' (e.g., transport block size, modulation scheme, coding information, etc.) is transmitted via a specific subframe. If so, at least one user equipment located in a corresponding cell monitors PDCCH using RNTI information of its own. If there is at least one user equipment having the RNTI 'A', the user equipments receive the PDCCH and then receive PDSCH indicated by 'B' and 'C' through the information of the received PDCCH.

Figure 6:
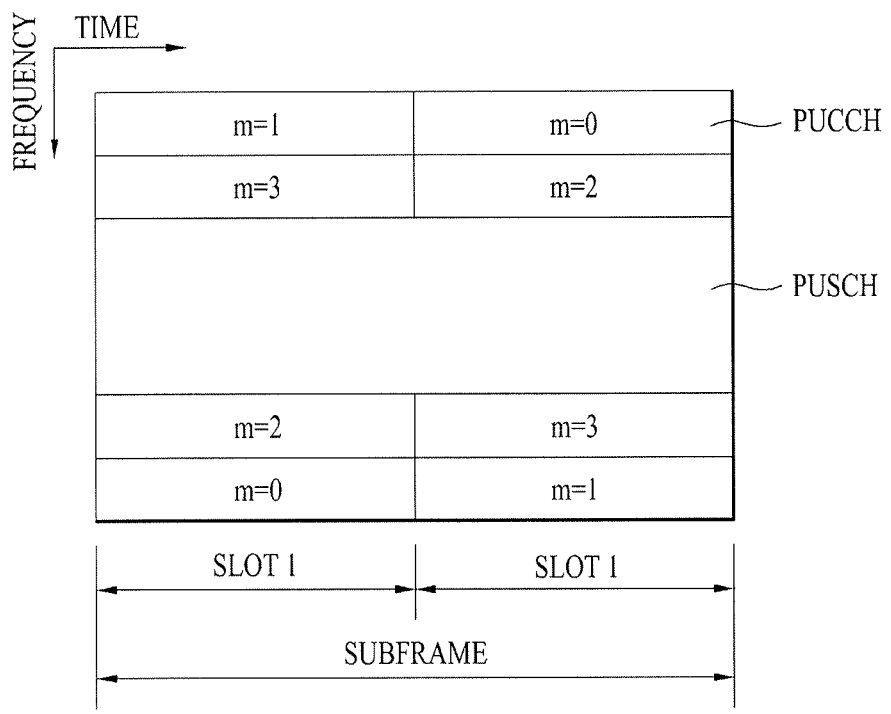
FIG. 6 is a diagram for one example of a structure of an uplink (UL) subframe used by LTE system.

FIG. 6 is a diagram for one example of a structure of an uplink (UL) subframe used by LTE system.

Referring to FIG. 6, a UL subframe may be divided into a region for assigning PUCCH (physical uplink control channel) configured to carry control information and a region for assigning PUSCH (physical uplink shared channel) configured to carry user data. A middle part of a subframe is assigned to the PUSCH and both side parts of a data region in frequency domain are assigned to the PUSCH. The control information carried on the PUCCH may include ACK/NACK used for HARQ, CQI (channel quality indicator) indicating a DL Channel state, an RI (rank indicator) for MIMO, an SR (scheduling request) that is a UL resource allocation request, and the like. The PUCCH for a single user equipment uses a single resource block occupying a different frequency in each slow within a subframe. In particular, a pair of resource blocks assigned to the PUCCH experience frequency hopping on a slot boundary. Specifically, FIG. 6 shows one example that PUCCH (m=0), PUCCH (m=1), PUCCH (m=2), and PUCCH (m=3) are assigned to the subframe.

In the following description, MIMO system is explained. First of all, MIMO (multi-input multi-output) is a method that uses a plurality of transmitting antennas and a plurality of receiving antennas. And, this method may be able to improve efficiency in transceiving data. In particular, a transmitting or receiving stage of a wireless communication system uses a plurality of antennas to increase capacity or enhance performance. In the following description, the MIMO may be called 'multiple antennas (multi-antenna)'.

The MIMO technology does not depend on a single antenna path to receive one whole message. Instead, the MIMO technique completes data by putting fragments received via several antennas together. If the MIMO technique is adopted, a data transmission rate within a cell area having a specific size may be improved or a system coverage may be increased by securing a specific data transmission rate. Moreover, this technique may be widely applicable to a mobile communication terminal, a relay and the like. According to the MIMO technique, it may be able to overcome the transmission size limit of the related art mobile communication which used to use a single data.

Figure 7:
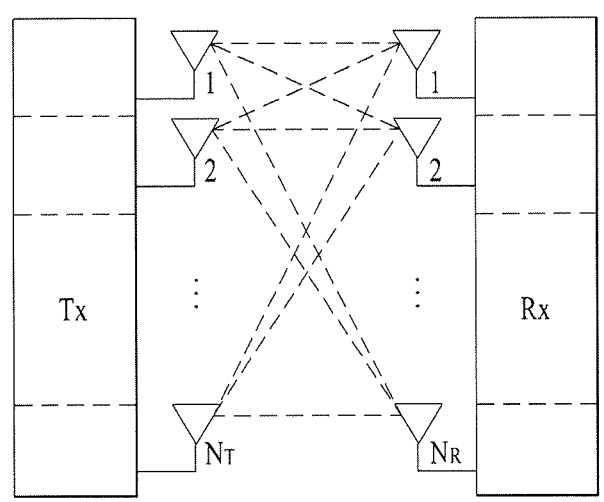
FIG. 7 is a diagram for a configuration of a general multi-antenna (MIMO) communication system.

FIG. 7 is a diagram for a configuration of a general multi-antenna (MIMO) communication system. $N_T$ transmitting antennas are provided to a transmitting stage, while $N_R$ receiving antennas are provided to a receiving stage. In case that each of the transmitting and receiving stages uses a plurality of antennas, theoretical channel transmission capacity is increased more than that of a case that either the transmitting stage or the receiving stage uses a plurality of antennas. The increase of the channel transmission capacity is in proportion to the number of antennas. Hence, a transmission rate is enhanced and frequency efficiency can be raised. Assuming that a maximum transmission rate in case of using a single antenna is set to $R_0$, the transmission rate in case of using multiple antennas may be theoretically raised by a result from multiplying the maximum transmission rate $R_0$ by a rate increasing rate $R_1$, as shown in Formula 1. In this case, $R_1$ is a smaller one of $N_T$ and $N_R$.

$$R_i = \min(N_T, N_R) \quad \text{[Formula 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many ongoing efforts are made to various techniques to substantially improve a data transmission rate. And, these techniques are already adopted in part as standards for the 3G mobile communications and various wireless communications such as a next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

Figure 1:
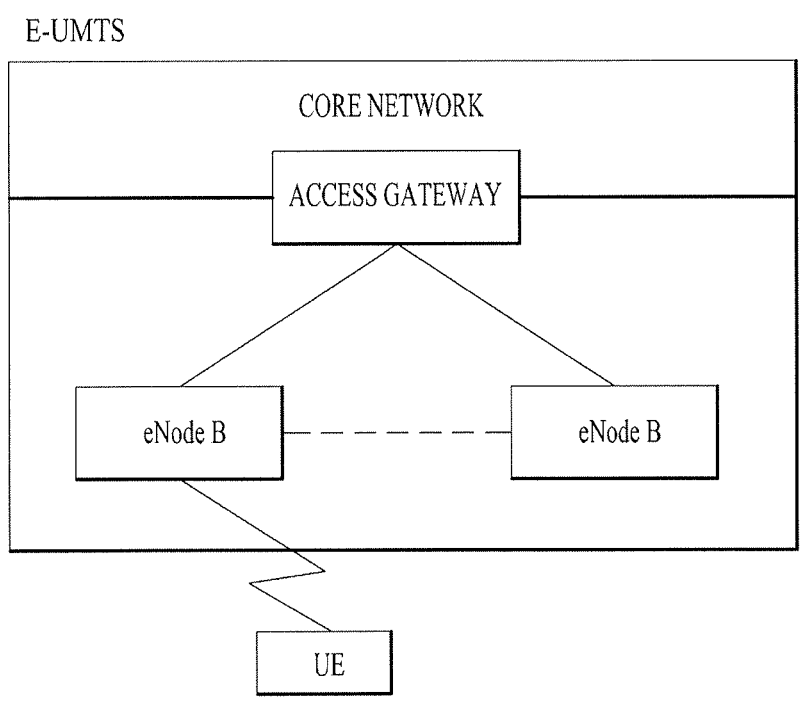
FIG. 1 is a schematic diagram of E-UMTS network structure as an example of a mobile communication system.

In order to explain a communicating method in an MIMO system in detail, mathematical modeling can be represented as follows. Referring to FIG. 1, assume that $N_T$ transmitting antennas and $N_R$ receiving antennas exist. First of all, regarding a transmission signal, if there are $N_T$ transmitting antennas, $N_T$ maximum transmittable information exists. Hence, the transmission information may be represented by the vector shown in Formula 2.

$$s = [s_1, s_2, \Lambda s_{N_T}]^T \quad \text{[Formula 2]}$$

Meanwhile, transmission powers can be set different from each other for transmission information $s_1, s_2, \ldots, s_{N_T}$, respectively. If the transmission powers are set to $P_1, P_2, \Lambda,$ $P_{N_T}$, respectively, the transmission power adjusted transmission information can be represented as Formula 3.

$$\hat{s}=[\hat{s}_1,\hat{s}_2,\Lambda,\hat{s}_{N_T}]^T=[P_1s_1,P_2s_2,\Lambda,P_{N_T}s_{N_T}]^T \quad [\text{Formula 3}]$$

And, ŝ may be represented as Formula 4 using a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad [\text{Formula 4}]$$

Let us consider a case of configuring $N_T$ transmitted signals $x_1, x_2, \ldots, x_{N_T}$, which are actually transmitted, by applying a weight matrix W to a transmission power adjusted information vector ŝ. In this case, the weight matrix plays a role in properly distributing each transmission information to each antenna according to a transmission channel status and the like. The transmitted signals are set to $x_1, x_2, \ldots, x_{N_T}$ may be represented as Formula 5 using a vector X. In this case, $W_{ij}$ means a weight between an $i^{th}$ transmitting antenna and a $j^{th}$ information. And, the W may be called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T1} & w_{N_T2} & \ldots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad [\text{Formula 5}]$$

$$W\hat{s} = WPs$$

Generally, a physical meaning of a rank of a channel matrix may indicate a maximum number for carrying different information on a granted channel. Since a rank of a channel matrix is defined as a minimum number of the numbers of independent rows or columns, a rank of a channel is not greater than the number of rows or columns. For example by formula, a rank of a channel H (i.e., rank (H)) is limited by Formula 6.

$$\text{rank}(H) \le \min(N_T, N_R) \quad [\text{Formula 6}]$$

Moreover, let's define each different information sent by MIMO technology as 'transport stream' or 'stream' simply. This 'stream' may be called a layer. If so, the number of transport streams is unable to be greater than a channel rank, which is the maximum number for sending different information. Hence, the channel matrix H may be represented as Formula 7.

$$\text{\# of streams} \le \text{rank}(H) \le \min(N_T, N_R) \quad [\text{Formula 7}]$$

In this case, '# of streams' may indicate the number of streams. Meanwhile, it should be noted that one stream is transmittable via at least one antenna.

Various methods for making at least one stream correspond to several antennas may exist. These methods may be described in accordance with a type of MIMO technique as follows. First of all, if one stream is transmitted via several antennas, it may be regarded as spatial diversity. If several streams are transmitted via several antennas, it may be regarded as spatial multiplexing. Of course, such an intermediate type between spatial diversity and spatial multiplexing as a hybrid type of spatial diversity and spatial multiplexing may be possible.

In the following description, a reference signal is explained.

First of all, when a packet is transmitted in a wireless communication system, since the transmitted packet is transmitted on a radio channel, signal distortion may occur in the transmitting process. In order for a receiving side to correctly receive the distorted signal, it is able to receive a correct signal in a manner of finding out a channel information and then correcting the distortion of a transmitted signal by the channel information. In order to find out the channel information, a following method is mainly used. First of all, a signal known to both a transmitting side and a receiving side is transmitted. Secondly, when the signal is received on a channel, information of the channel is found out with a distorted extent of the corresponding signal. In this case, the signal known to both of the transmitting side and the receiving side is called a pilot signal or a reference signal.

Recently, when packets are transmitted in most of mobile communication systems, multiple transmitting antennas and multiple receiving antennas are adopted to increase transceiving efficiency rather than a single transmitting antenna and a single receiving antenna. In case that a transmitting or receiving side intends to achieve capacity enlargement or performance enhancement using multiple antennas, since the corresponding side can receive a correct signal if obtaining a channel status between each transmitting antenna and each receiving antenna, a separate reference signal should exist for each transmitting antenna.

Reference signal in a wireless communication system can be mainly categorized into two types. In particular, there are a reference signal for the purpose of channel information acquisition and a reference signal used for data demodulation. Since the object of the former reference signal is to enable a UE (user equipment) to acquire a channel information in DL (downlink), the former reference signal should be transmitted on broadband. And, even if the UE does not receive DL data in a specific subframe, it should perform a channel measurement by receiving the corresponding reference signal. Moreover, the corresponding reference signal can be used for a measurement for mobility management of a handover or the like.

The latter reference signal is the reference signal transmitted together when a base station transmits DL data. IF a UE receives the corresponding reference signal, the UE can perform channel estimation, thereby demodulating data. And, the corresponding reference signal should be transmitted in a data transmitted region.

In LTE system two types of DL reference signals are defined for a unicast service. In particular, the DL reference signals may be categorized into a common reference signal (CRS) for an acquisition of information on a channel state and a measurement associated with a handover or the like and a dedicated reference signal (DRS) used for a data demodulation. In this case, the CRS may be named a cell-specific RS and the DRS may be named a UE-specific RS.

In LTE system, a DRS is used for data demodulation only, while a CRS is used for two kinds of purposes including channel information acquisition and data demodulation. The CRS is a cell-specific reference signal and is transmitted in each subframe across a broadband. Moreover, the CRS is transmitted based on maximum 4 antenna ports depending on the number of transmitting antennas of a base station. For instance, in case that the number of the transmitting antennas of the base station is 2, CRSs for antenna #0 and antenna #1 are transmitted. For another instance, in case that the number of the transmitting antennas of the base station is 4, CRSs for antennas #0 to #3 are transmitted.

Figure 8:
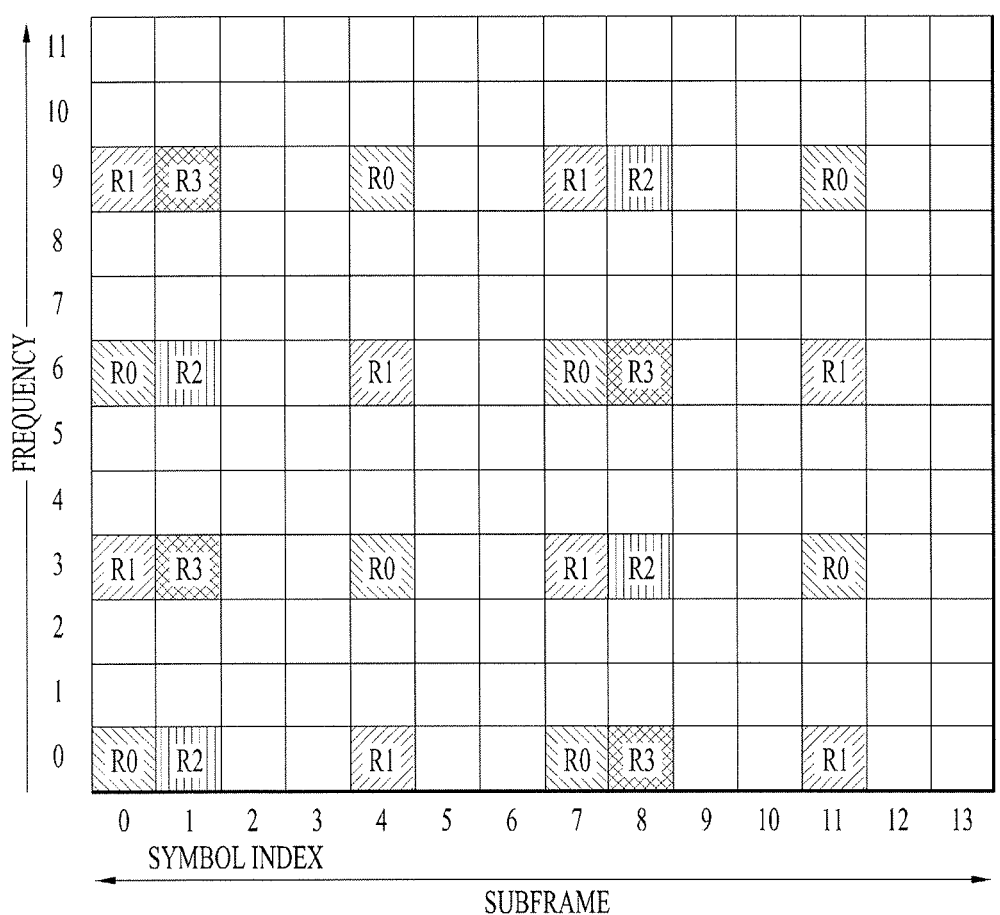
FIG. 8 is a diagram for one example of a general CRS pattern in case that 4 transmitting antenna ports exist in LTE system.

FIG. 8 is a diagram for one example of a general CRS pattern in case that 4 transmitting antenna ports exist in LTE system.

Referring to FIG. 8, in case that CRS is mapped to a time-frequency resource in LTE system, a reference signal for a single antenna port is transmitted in a manner that 1 RE is mapped to 1 RE per 6 REs on a frequency axis. Since one RB is configured with 12 REs on a frequency axis, 2 REs per RB are used for one antenna port.

Figure 9:
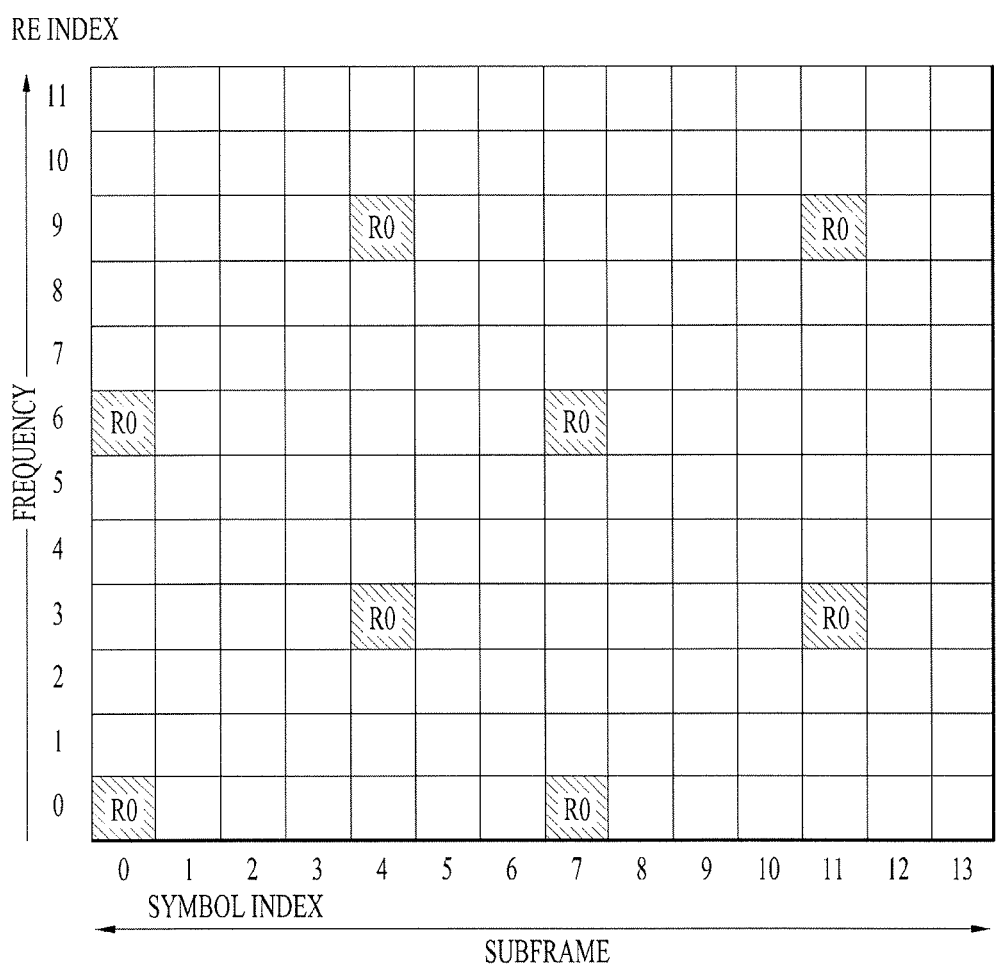
FIG. 9 is a diagram for one example of a CRS pattern for a transmitting antenna port 0 in LTE system.

FIG. 9 is a diagram for one example of a CRS pattern for a transmitting antenna port 0 in LTE system.

Meanwhile, in LTE-A system advanced and evolved from LTE system, a base station should be designed enough to support maximum 8 transmitting antennas in downlink (DL). Hence, reference signals for the maximum 8 transmitting antennas should be supported as well.

In particular, since DL reference signals for maximum 4 antenna ports are defined in LTE system, in case that a base station includes at least 4 DL transmitting antennas or maximum 8 DL transmitting antennas in LTE-A system, it is necessary to define reference signals for these antenna ports in addition. Moreover, the reference signals for the maximum 8 transmitting antennas should be defined to include the above-mentioned two types of the reference signals including the reference signal for the channel measurement and the reference signal for the data demodulation.

In designing LTE-A system, one of important factors to be considered is backward compatibility. Namely, an LTE user equipment should operate or work well in LTE-A system without overworking and a corresponding system should support it as well. In aspect of reference signal transmission, RS for maximum 8 transmitting antennas should be additionally defined on time-frequency region in which CRS defined in LTE system is transmitted. Yet, in LTE-A system, if a reference signal pattern for maximum 8 transmitting antennas is added to a full band in each subframe in the same manner of the CRS of an existing LTE system, overhead increases excessively.

Hence, reference signals newly designed in LTE-A system can be mainly categorized into two types including a reference signal (CSI-RS: Channel State Information-RS) for the purpose of channel measurement for selection of MCS, PMI or the like and a reference signal (DM-RS) for demodulation of data transmitted via 8 transmitting antennas.

The CSI-RS for the purpose of the channel measurement is characterized in being mainly designed for the purpose of measurement for channel estimation unlike that the conventional CRS is used for data demodulation as well as for the purpose of measurement for channel estimation, handover or the like. Since CSI-RS is just transmitted for the purpose of obtaining information on a channel state, it may not need to be transmitted in each subframe unlike CRS. In the current LTE-A standard, CSI-RS can be assigned to antenna ports 15 to 22 and CSI-RS configuration information is defined as received by upper layer signaling.

Moreover, for data demodulation, DM-RS is transmitted as a dedicated reference signal to a UE scheduled in a corresponding time-frequency region. In particular, DM-RS transmitted to a specific UE is transmitted only in a region, in which the corresponding UE is scheduled, i.e., a time-frequency region for receiving data.

Meanwhile, it is expected that LTE-A system, which is the standard of a next generation mobile communication system, will support CoMP (coordinated multi point) transmission scheme unsupported by the previous standard in order to enhance a data transmission rate. In this case, the CoMP transmission scheme means a transmission scheme for enabling at least two base stations or cells to coordinately communicate with a user equipment to enhance communication performance between a base station (cell or sector) and a user equipment located in a radio shadow area.

The CoMP transmission scheme may be categorized into CoMP-JP (CoMP-Joint Processing) of a coordinated MIMO type through data sharing and CoMP-CS/CB (CoMP Coordinated Scheduling/Coordinated Beamforming).

In a joint processing scheme (CoMP-JP) in case of a downlink, a user equipment can receive data from base stations, each of which performs the CoMP transmission, simultaneously and instantly and is then able to enhance reception performance by combining the signals received from the base stations together [Joint Transmission (JT)]. And, it is able to consider a method for one of the base stations, each of which performs the CoMP transmission, to transmit data to the user equipment at a specific timing point [Dynamic Point Selection (DPS)]. On the other hand, in CoMP-CS/CB (CoMP Coordinated Scheduling/Coordinated Beamforming), a user equipment can instantly receive data from a single base station, and more particularly, from a serving base station by beamforming.

In CoMP-JP (CoMP-Joint Processing) in case of an uplink, each base station can receive a PUSCH signal from a user equipment simultaneously [Joint Reception (JR)]. On the other hand, in CoMP-CS/CB (CoMP Coordinated Scheduling/Coordinated Beamforming), a single base station receives PUSCH only. In doing so, determination for using the CoMP-CS/CB (CoMP Coordinated Scheduling/Coordinated Beamforming) is made by coordinated cells (or base stations).

Meanwhile, CoMP scheme is applicable to heterogeneous networks as well as to a homogeneous network configured with macro eNBs only.

Figure 10:
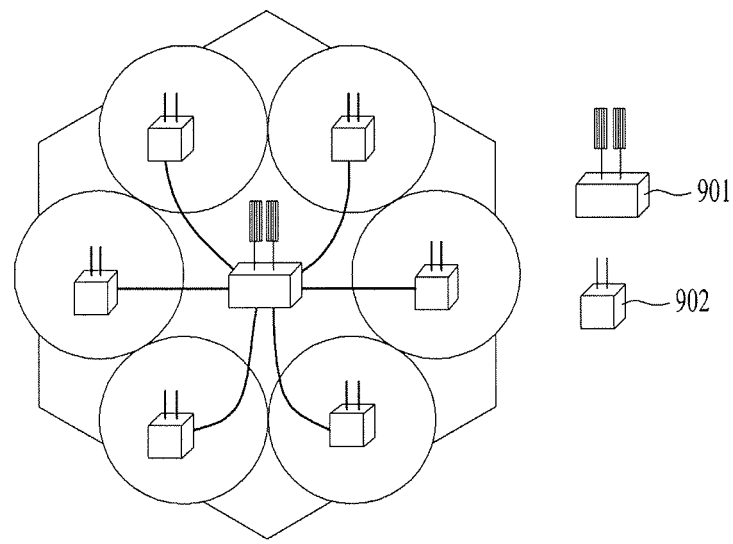
FIG. 10 is a diagram for one example of a configuration of a CoMP scheme applicable heterogeneous network.

FIG. 10 is a diagram for one example of a configuration of a CoMP scheme applicable heterogeneous network. Particularly, FIG. 9 shows a network including a macro eNB 901, an RRH (radio remote head) 902 configured to transceive a signal with a relatively small transmission power, and the like. In this case, a pico cell or RRH located within a coverage of the macro eNB can be connected to the macro eNB via an optical cable or the like. Moreover, the RRH can be named a micro eNB.

Referring to FIG. 10, since a transmission power of an RRH is relatively smaller than that of a macro eNB, it can be observed that a coverage of each RRH is relatively smaller than that of the macro eNB.

The object of the above CoMP scenario is to expect a gain of an increasing overall system throughput through cooperative transmission in-between in a manner of covering a coverage hole of a specific area through RRHs added in comparison with a previous system, in which macro eNB exists, or utilizing a multitude of transmitting points (TPs) including RRH.

Meanwhile, RRHs shown in FIG. 10 can be sorted into two types. In particular, one of the two types corresponds to a case that a cell identifier (cell-ID) different from that of a macro eNB is granted to each of the RRHs. And, each of the RRHs is regarded as another small-scale cell. The other corresponds to a case that each of the RRHs operates with the same cell identifier of the macro eNB.

In case that different cell identifiers are granted to each RRH and a macro eNB, respectively, a UE recognizes the RRH and the macro eNB as different cells. In doing so, the UE located at an edge of each cell receives a considerable amount of interference from a neighbor cell. In order to reduce such an interference effect and raise a transmission rate, various CoMP schemes have been proposed.

On the contrary, in case that the same cell identifier is granted to each RRH and a macro eNB, a UE recognizes the RRH and the macro eNB as a single cell. The UE receives data from the each RRH and the macro eNB. And, in case of a data channel, each UE can estimate its actual channel for transmitting data by simultaneously applying the precoding used for a data transmission of the each UE to a reference signal. In this case, the precoding applied reference signal is the above-mentioned DM-RS.

As mentioned in the foregoing description, a user equipment of an existing LTE system performs a channel estimation using CRS only. Through this, the user equipment of the existing LTE system performs both a data demodulation and a channel state information feedback and also performs cell tracking, frequency offset compensation, synchronization, RRM (radio resource management) measurement such as RSSI/RSRP/RSRQ (received signal strength indicator/reference signal received power/reference signal received quality) measurement, and the like.

Meanwhile, in case of a user equipment of LTE-A system, among the roles of the existing CRS, DM-RS is extended to be responsible for roles related to the channel estimation and the data demodulation and CSI-RS is extended to be responsible for a role related to the channel state information feedback. Yet, other functions are still performed through CRS.

The present invention proposes a method of using CSI-RS for a channel state information feedback when a user equipment performs an operation of measuring a signal of a cell (or a transmitting point failing to have a separate cell identifier).

Figure 11:
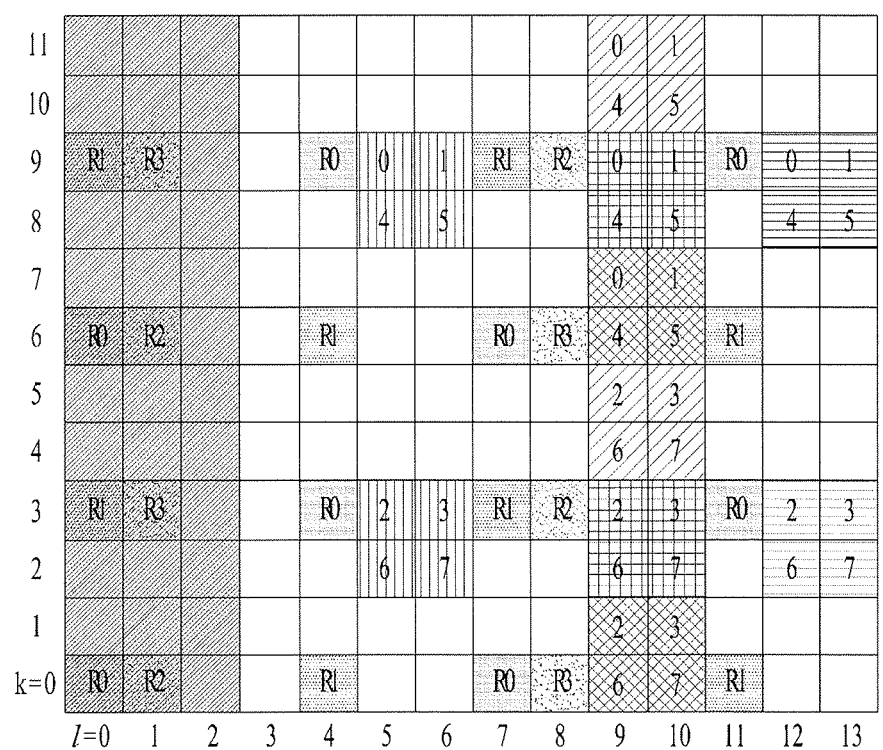
FIG. 11 is a diagram for one example of a CSI-RS pattern defined by 3GPP standard.

FIG. 11 is a diagram for one example of a CSI-RS pattern defined by 3GPP standard. In particular, FIG. 11 shows one example of CSI-RS pattern defined with 8 antenna ports.

Referring to FIG. 11, CSI-RS for a single antenna port is transmitted by spreading over 2 OFDM symbols. Two CSI-RSs share 2 REs with each other and are discriminated from each other using orthogonal codes. For instance, REs represented as a numeral 0 and a numeral 1 mean 2 REs carrying an antenna port 0 and an antenna port 1.

For clarity of the description of the present invention, such a representation as CSI-RS antenna port 0, CSI-RS antenna port 1 and the like is used. For the discrimination ion from other types of RS such as CRS and DM-RS, the CSI-RS antenna port 0, the CSI-RS antenna port 1 and the like may have indexes such as antenna port 15, antenna port 16 and the like, respectively. CSI-RS may be configured as defined as 1, 2 or 4 antenna ports as well as 8 antenna ports.

CSI-RS is intermittently transmitted in a partial subframe instead of being transmitted in each subframe in general. Moreover, density of CSI-RS antenna ports is smaller than that of antenna ports of CRS, if a user equipment perform a measurement on RSRP/RSRQ or the like for a specific cell or a specific transmitting point using CSI-RS, measurement accuracy may be possibly degraded due to insufficient energy of a signal that becomes a target of the measurement.

Particularly, in case that a cell or transmitting point transmits CSI-RS using one or two antenna ports, since energy occupied by the CSI-RS amounts to 2 REs per PRB pair only, such problem becomes further serious. Alternatively, although CSI-RS occupies a considerably number of antenna ports, if a measurement is performed using the antenna ports in part, e.g., if antenna port assigned to a specific transmitting point is measured for the purpose of measuring a signal strength at the specific transmitting point, such problem may be caused as well.

1st Embodiment

In order to solve the above-mentioned problems, a 1st embodiment of the present invention proposes to perform an operation of measurement by bundling multiple antenna ports in case of performing the measurement based on CSI-RS. In this case, 'bundling multiple antennas' may have the following meaning. First of all, assuming that CSI-RS transmitted from multiple antenna ports is transmitted from the same antenna, i.e., the CSI-RS passes through the same channel, a coherent combining is performed and RSRP/RSRQ/pathloss (reference signal received power/reference signal received quality/pathloss) and the like are then calculated.

Figure 12:
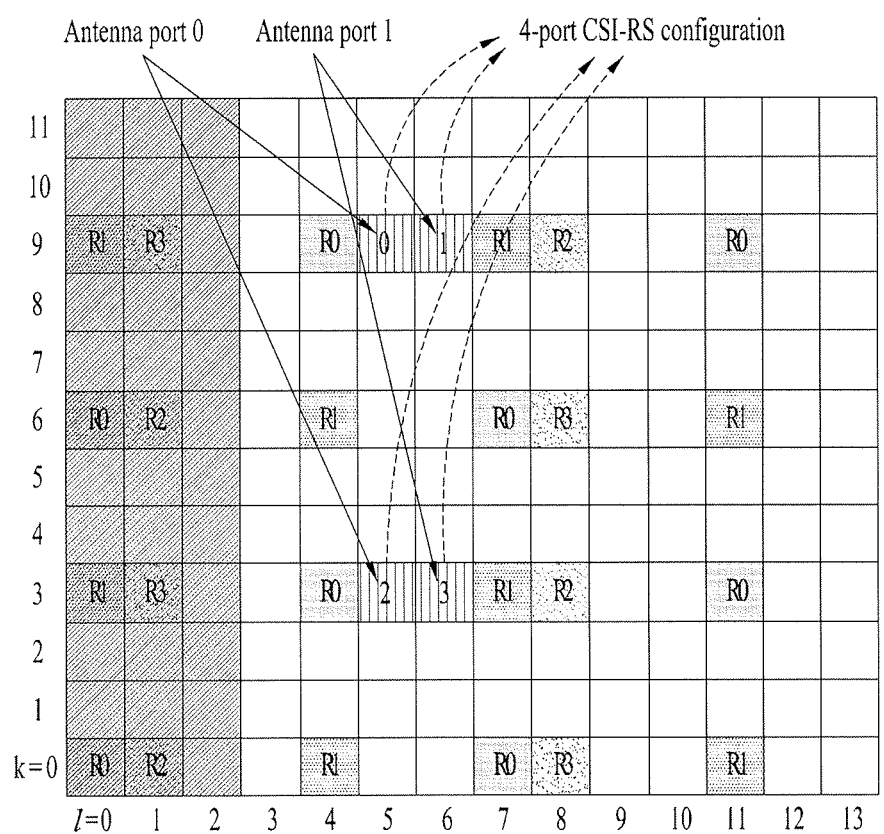
FIG. 12 is a diagram for one example of configuring an antenna port of CSI-RS according to a $1^{st}$ embodiment of the present invention.

FIG. 12 is a diagram for one example of configuring an antenna port of CSI-RS according to a $1^{st}$ embodiment of the present invention.

Referring to FIG. 12, a cell or transmitting point having two antennas configures 4 antenna port CRS-RS and antenna port 0, antenna port 1 and antenna port 3 are transmitted from the same antenna. In doing so, since a user equipment can perform a coherent combining on the antenna port 0 and the antenna port 2 and a coherent combining on the antenna port 1 and the antenna port 3, it is advantageous in that measurement accuracy increases.

Particularly, when some limitation is put on boosting a power of a specific CSI-RS RE due to the restriction put on an amplifier of a transmitting point, it is advantageous in that a measurement can be performed using sufficient energy.

To this end, a base station can inform a user equipment of a set of CSI-RS antenna ports, which are available for the user equipment to measure RSRP/RSRQ/pathloss (reference signal received power/reference signal received quality/pathloss) or the like, by upper layer signaling such as RRC signaling and the like. In particular, the available CSI-RS antenna ports can be denoted by a set of antenna ports for which a user equipment can assume a coherent combining. Alternatively, a measurement operation can be performed in a manner of calculating a measurement value at each antenna port separately and then averaging the measurement value corresponding to the CSI-RS antenna port available together.

More generally, a cell can inform a user equipment of relationship between antenna ports of CSI-RS (e.g., whether CSI-RS is transmitted from a same transmitting point (or antenna), whether a same CSI-RS is repeated, etc.), a spreading sequence or the like by upper layer signaling (e.g., RRC signaling, etc.).

In performing the above-mentioned operation, a base station can inform a user equipment of the number or set of antenna ports which will be used by the user equipment in calculating CSI information such as PMI, CQI and the like actually by additional signaling.

For instance, in FIG. 12, since the actual number of transmitting antennas of a user equipment is 2, a base station can instruct the user equipment to use a codebook designed for two transmitting antennas in reporting PMI. Of course, as mentioned in the foregoing description, the user equipment can determine a PMI appropriate for itself based on the measurement obtained after the coherent combining.

Meanwhile, it is able to implement the 1$^{st}$ embodiment of the present invention in a manner that a user equipment measures RSRP/RSRQ/pathloss by combining a plurality of CSI-RS configurations.

Figure 13:
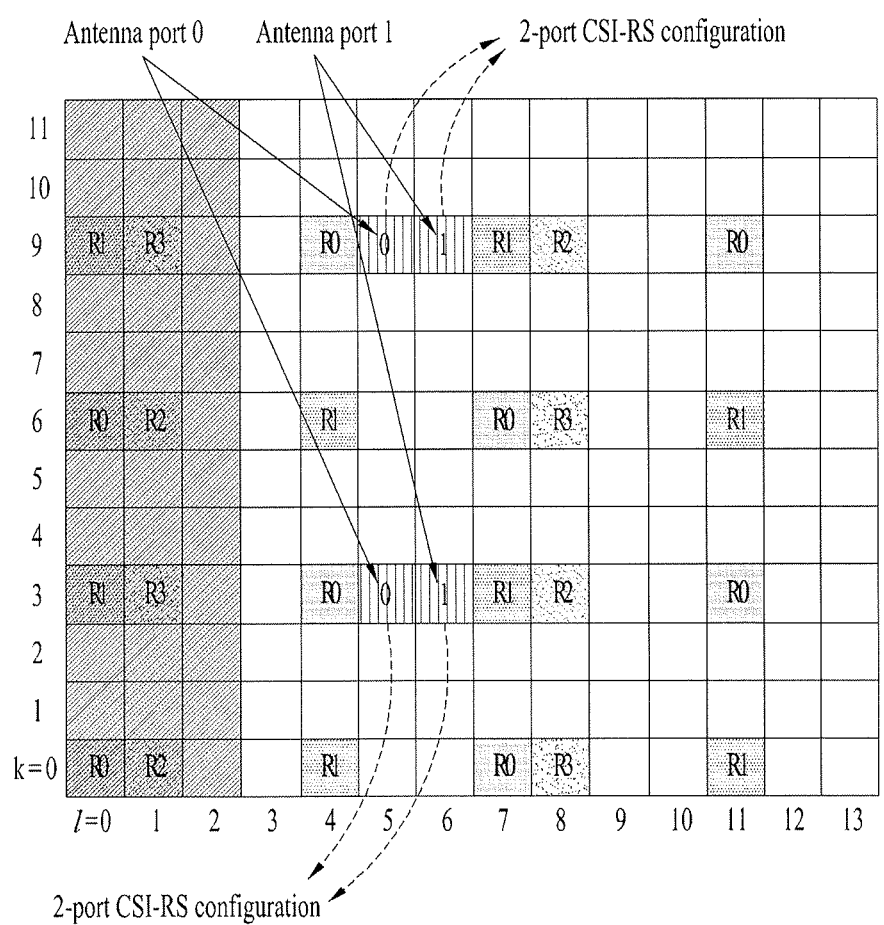
FIG. 13 is a diagram for another example of configuring an antenna port of CSI-RS according to a $1^{st}$ embodiment of the present invention.

FIG. 13 is a diagram for another example of configuring an antenna port of CSI-RS according to a 1$^{st}$ embodiment of the present invention.

Referring to FIG. 13, a base station signals 2 CSI-RS configurations transmitted from a single cell or transmitting point and a user equipment measures RSRP/RSRQ/pathloss and the like by combining two CSI-RS transmitted from the same cell or transmitting point.

In particular, the base station configures one CSI-RS, repeatedly transmits it in a same frame, and is then able to announce such event by higher layer signaling such as RRC signaling and the like. In doing so, the CSI-RS repeated location can be determined in advance. For instance, if 2-antenna port CSI-RS is repeated twice, a location of the 2$^{nd}$ CSI-RS may correspond to a location of transmitting antenna ports 2 and 3 in 4-antenna port CSI-RS.

More generally, if n-antenna port CSI-RS is repeated N times, a location of the repetition may be determined as RE occupied by n*N-antenna port CSI-RS including RE of n-antenna port CSI-RS.

Meanwhile, when a plurality of CSI-RS configurations are signaled, if the CSI-RS configuration transmitted in a same OFDM symbol is indicated, CSI-RS shares a transmission power of a base station before being transmitted at the same time. Yet, if CSI-RS configurations transmitted in different OFDM symbols or subframes are indicated, CSI-RSs do not share the transmission power of the base station with each other because they are transmitted in different times, respectively. Hence, it is able to transmit a plurality of CSI-RSs using signal energy by performing CSI-RS transmission with a more power.

Moreover, in order to perform an RRM measurement by informing a UE of a plurality of CSI-RS configurations and then combining specific CSI-RS configurations among the whole CSI-RS configurations, it is necessary to indicate that the measurement is performed by combining which CSI-RS among a plurality of the CSI-RS configurations. In order to reduce such signaling overhead, additionally proposed is a method for an eNB to instruct a UE to perform an RRM measurement by combining all CSI-RSs in specific subframes. Since the corresponding method just needs to perform a signaling on a corresponding subframe among a plurality of the CSI-RS configurations, signaling can be simplified.

Besides, the above-mentioned CSI-RS based RRM measurement can be performed by periods. And, it is also possible for a base station to separately signal a reporting periodicity and a measurement target. Additionally, regarding the CSI-RS based RRM measurement, it is preferable that aperiodic measurement execution is instructed by DL/UL control signaling. In this case, the aperiodic measurement is executed in a manner of performing a measurement once with reference to a specific subframe or a plurality of subframes by an instruction and then reporting a corresponding measurement result instead of performing measurements periodically. For this aperiodic measurement instruction, the repetition of the single antenna transmission in the above-mentioned single CSI-RS configuration or the operation of combining a plurality of the CSI-RS configurations can be performed aperiodically as well.

2$^{nd}$ Embodiment

A 2$^{nd}$ embodiment of the present invention proposes to apply the above-described 1$^{st}$ embodiment to an interference measurement of measuring a size or spatial direction of interference and the like. For instance, an information indicating an interference measured at a prescribed one of several antenna ports configuring a single CSI-RS configuration can assume a same attribute and an information indicating whether an average of the measured interferences can be utilized for calculation of CQI and the like can be delivered to a user equipment by a base station trough upper layer signaling such as RRC signaling. In particular, CSI-RS configuration for this interference measurement can be set to use a zero transmission power.

For another instance, a user equipment receives a delivery of at least one CSI-RS configuration and is then able to receive a delivery of an information indicating an interference measured in a prescribed one of the at least one CSI-RS configuration can assume a same attribute and an information indicating whether an average of the measured interferences can be utilized for calculation of CQI and the like from a base station by upper layer signaling such as RRC signaling.

In the following description, an operation of the present invention is described in detail in aspect of interference measurement with reference to the accompanying drawing.

Figure 14:
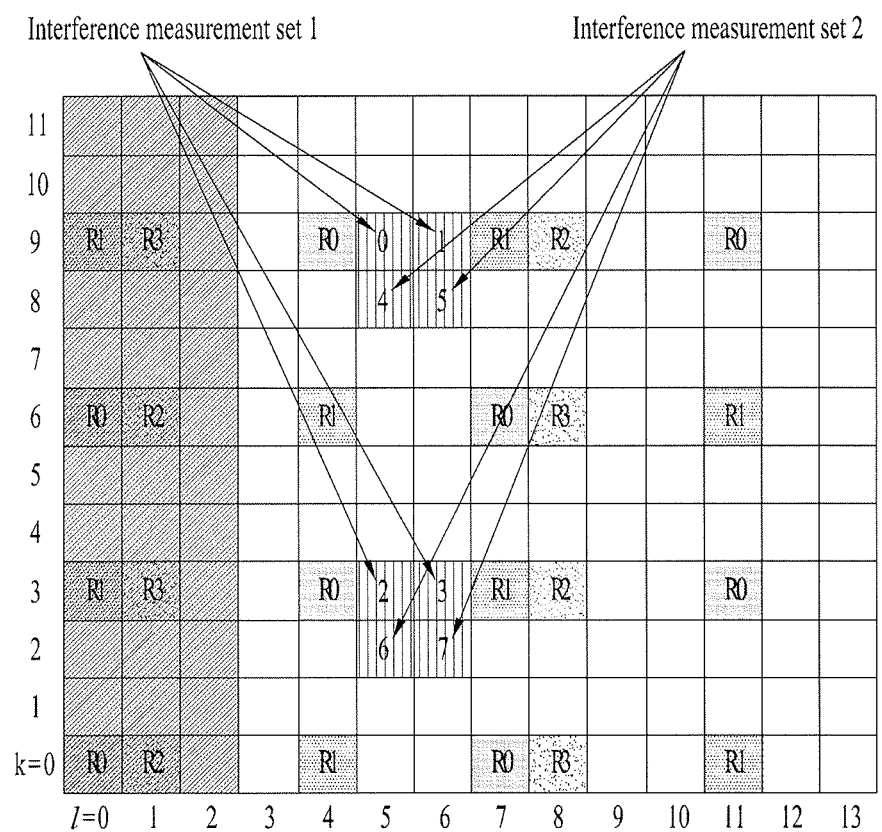
FIG. 14 is a diagram for one example of configuring an antenna port of CSI-RS according to a $2^{nd}$ embodiment of the present invention.

FIG. 14 is a diagram for one example of configuring an antenna port of CSI-RS according to a 2$^{nd}$ embodiment of the present invention. In particular, FIG. 14 shows one example of designating a group that can be assumed as a same interference among antenna ports (or REs) belonging to a single CSI-RS configuration.

Referring to FIG. 14, a base station sets up one 8-antenna port CSI-RS configuration and the corresponding CSI-RS configuration may include a zero transmission power CSI-RS. In this case, the base station assumes that interferences measured at antenna ports 0 to 3 in the 8-antenna port CSI-RS configuration are in a same interference situation and designates it as an interference measurement group 1 for taking an average, by a separate signaling.

Moreover, the base station assumes that interferences measured at antenna ports 4 to 7 in the 8-antenna port CSI-RS configuration are in an interference situation different from that of the former group and is able to designate it as an interference measurement group 2 for taking an average between the corresponding 4 antenna ports only.

Through this operation, the base station can enable a user equipment to perform an interference measurement by reflecting various interference situations despite maintaining a small number of CSI-RS configurations. For example of the various interference situations, a neighbor cell or transmitting point of the base station takes an action of transmitting its DL signal on RE corresponding to the interference measurement group 1 but takes an action of a muting operation on RE corresponding to the interference measurement group 2, thereby applying no interference. To this end, the corresponding base station reports, to the neighbor base station or the neighbor transmitting point, that the corresponding base station performs the muting on which RE or may deliver a signal for requesting the neighbor base station or the neighbor transmitting point to perform the muting on a specific RE (or increasing or decreasing the number of muting REs).

Figure 15:
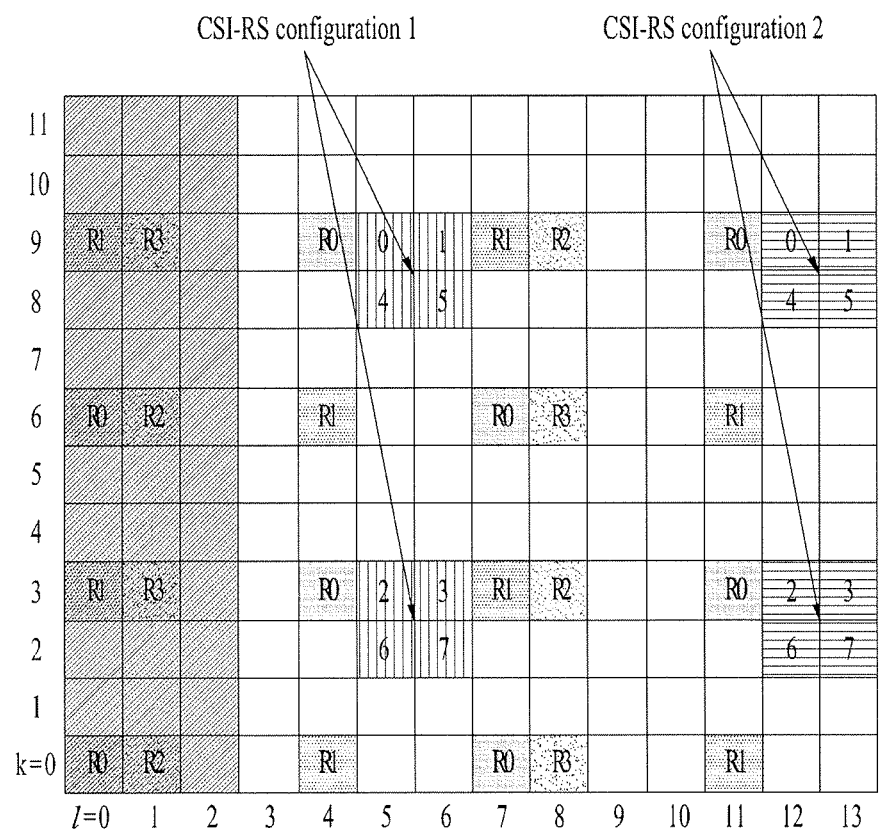
FIG. 15 is a diagram for another example of configuring an antenna port of CSI-RS according to a $2^{nd}$ embodiment of the present invention.

FIG. 15 is a diagram for another example of configuring an antenna port of CSI-RS according to a 2$^{nd}$ embodiment of the present invention.

Referring to FIG. 15, a base station sets up two 8-antenna port CSI-RS configurations like CSI-RS configuration 1 and CSI-RS configuration 2. In this case, the base station informs a user equipment that interferences measured in the corresponding two CSI-RS configurations can be assumed as being in a same interference situation by a separate signaling. Having received such information, the user equipment takes an average of interferences measured at total 16 REs corresponding to the two configurations and is then able to estimate it as a final interference.

Specifically, since CSI-RS is transmitted in a relatively small number of subframes and REs, such operation is advantageous in improving the measurement inaccuracy that may be generated from performing an interference measurement on a single CSI-RS configuration only. Moreover, in order to reduce a signaling overhead, it is possible to operate in a manner that interferences in CSI-RS configuration existing in a same subframe (or, a zero transmission power configuration, a configuration for interference measurement, etc.) can be regarded as being always in a same interference environment.

Moreover, if there is no separate signaling or regulation between two different CSI-RS configurations, a user equipment may be regulated not to regard interferences measured in the two configurations as being in the same environment.

The above-described interference measuring operation of the present invention can interoperate with a set of subframes. For instance, the interference measurement through the CSI-RS configuration may interoperate with a CSI measurement subframe subset setup. In particular, a user equipment is set to measure interferences through a specific CSI-RS configuration among a plurality of CSI-RS configurations (or, some specific antenna ports in a single CSI-RS configuration). Simultaneously, a subframe set for a limited CSI measurement, in which a series of measurement operations performed for reporting CSI such as PMI/CQI/RI are limited to some selective subframe(s), can be set up as well.

In doing so, it is preferable that the user equipment performs the interference measurement on the assumption that REs belonging to the same subframe subset in the CSI-RS configuration are in the same interference environment. In particular, if REs belong to different CSI measurement subframe subsets despite belonging to the same CSI-RS configuration, the interference measurement is regarded as a measurement in a different interference environment and an average is not taken together.

For instance, a periodicity of an interference measurement performed CSI-RS configuration is 5 subframes and an offset is 0, a corresponding CSI-RS pattern appears in subframes 0, 5, 10, 15 . . . . And, assume that a base station sets up two CSI measurement subframe subsets in a manner of configuring the subframe subset 1 and the subframe subset 2 with even subframes and odd subframes, respectively. In this case, an interference amount for the subframe subset 1 is estimated with the interferences measured at the subframes 0, 10, 20 . . . in the CSI-RS pattern and an interference amount for the subframe subset 2 is estimated with the interferences measured at the subframes 5, 15, 25 . . . in the CSI-RS pattern. So to speak, if CSI-RS for performing an interference measurement exists in a specific subframe, an interference measured value measured from the corresponding CSI-RS represents interference values in all subframes belonging to the CSI measurement subframe subset including the corresponding subframe.

Meanwhile, periodicity of a CSI-RS configuration may not appropriately match repetition periodicity of a CSI measurement subframe. This is because the repetition periodicity of the CSI measurement subframe can be set to 8 ms unit that is the periodicity of a UL HARQ process of LTE system, whereas the periodicity of the CSI-RS configuration is set to multiples of 5 ms in general.

In this case, an independent subframe subset is signaled separately from a signaling of a CSI measurement subframe subset. And, it is preferable to assume that RE of the CSI-RS configuration belonging to the subframe subset is in a same interference situation. If the signaling for the separate subframe subset in the CSI-RS configuration is not given, interference measurement can be performed on the assumption of the same interference situation at all REs in the CSI-RS configuration. This corresponds to an operation unrelated to the CSI measurement subframe subset signaling, i.e., to a non-restrictive CSI measurement. In case of performing the non-restrictive CSI measurement, if CSI-RS for performing an interference measurement in a specific subframe exists, an interference measured value measured from the corresponding CSI-RS can represent interference values in all subframes.

According to the above description, the interference measured from the CSI-RS configuration can be utilized for a CSI reporting operation. For instance, a base station can designate a CSI-RS configuration or antenna port used for an interference measurement, which is supposed to be utilized for a specific periodic/aperiodic reporting, through upper layer signaling such as RRC signaling or L1/L2 control signaling.

When the CSI-RS based measurement (e.g., RSRP, RSRQ, pathloss, interference, etc.) mentioned in the foregoing description is performed, it may happen that CSI-RS transmission appears irregularly. For instance, When CSI-RS is configured to be periodically transmitted, if the transmission periodicity overlaps such a signal, which should be received by a legacy user equipment, as PBCH, the CSI-RS is not transmitted on a corresponding RE of a corresponding subframe. Hence, a user equipment can operate correctly only if excluding the above-described measurement execution from this CSI-RS.

Particularly, in case of a pathloss measurement based power control, if a user equipment measures a CSI-RS based pathloss at an RE on which the CSI-RS is not transmitted (e.g., RE on which PBCH is transmitted instead), it results in an inaccurate measured value that is not an actual pathloss with a base station. Eventually, it may cause a problem that a UL transmission power is set higher or lower unnecessarily. Therefore, in performing a measurement operation of RSRP, RSRQ, pathloss, interference and the like based on CSI-RS, the user equipment obtains a location of RE overlapping a signal having a priority higher than that of CSI-RS in advance and needs to be defined not to perform the measurement on such RE or to perform a corresponding operation (e.g., a UL transmission power control) by utilizing a value measured at a location except such RE. Moreover, it is preferable that a location of such RE is delivered to the user equipment by upper layer signaling.

And, it is apparent that the above-described present invention is not limited to CSI-RS but is applicable to a measurement through CRS.

Figure 16:
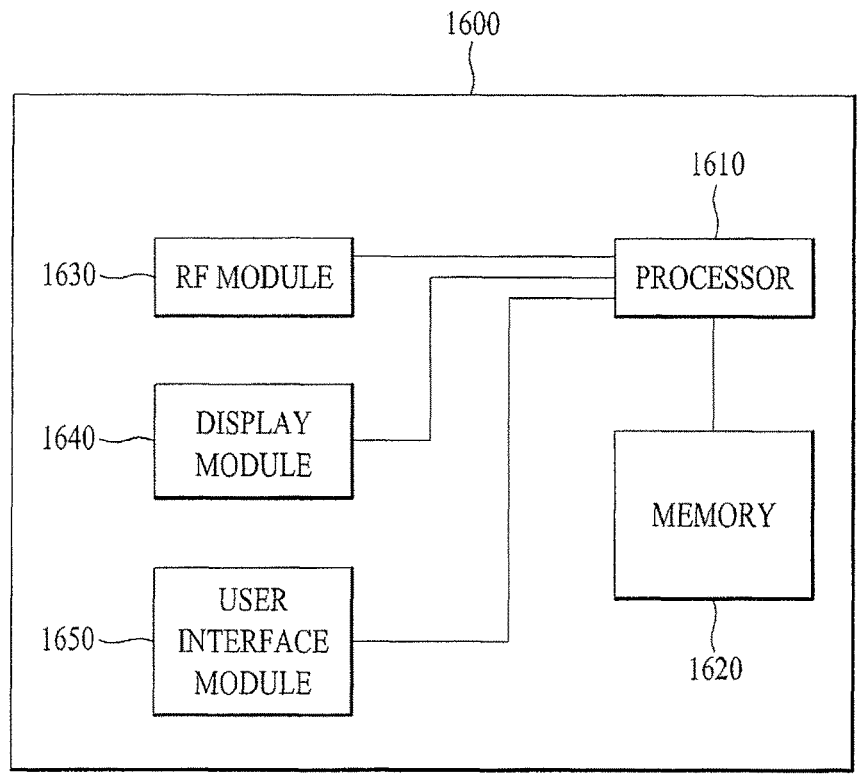
FIG. 16 is a block diagram for one example of a communication device according to one embodiment of the present invention.

FIG. 16 is a block diagram for one example of a communication device according to one embodiment of the present invention.

Referring to FIG. 16, a communication device 1600 includes a processor 1610, a memory 1620, an RF module 1630, a display module 1640 and a user interface module 1650.

The communication device 1600 is illustrated for clarity and convenience of the description and some modules can be omitted. Moreover, the communication device 1600 is able to further include at least one necessary module. And, some modules of the communication device 1600 can be further divided into sub-modules. The processor 1610 is configured to perform operations according to the embodiment of the present invention exemplarily described with reference to the accompanying drawings. In particular, the detailed operations of the processor 1610 can refer to the contents described with reference to FIGS. 1 to 15.

The memory 1620 is connected to the processor 1610 and stores operating systems, applications, program codes, data and the like. The RF module 1630 is connected to the processor 1610 and performs a function of converting a baseband signal to a radio signal or converting a radio signal to a baseband signal. For this, the RF module 1630 performs analog conversion, amplification, filtering and frequency uplink transform or inverse processes thereof. The display module 1640 is connected to the processor 1610 and displays various kinds of information. The display module 1640 can include such a well-known element as LCD (Liquid Crystal Display), LED (Light Emitting Diode), OLED (Organic Light Emitting Diode) and the like, by which the present invention is non-limited. The user interface module 1650 is connected to the processor 1610 and can include a combination of well-known interfaces including a keypad, a touchscreen and the like.

Figure 17:
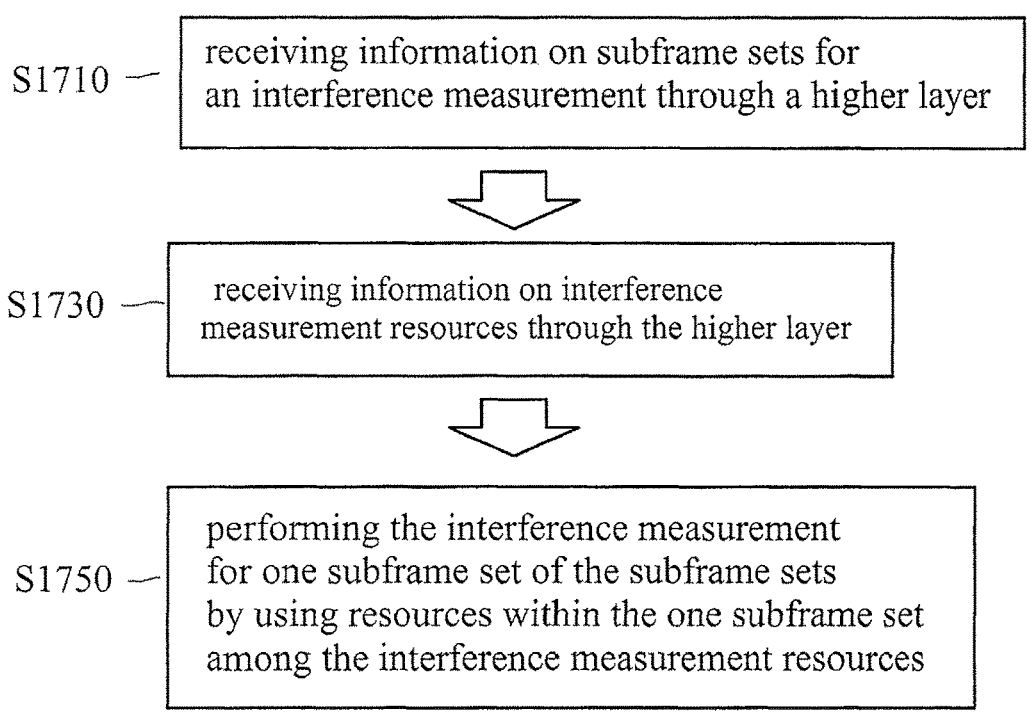
FIG. 17 is a diagram for one example of a method of performing a measurement by a UE in a wireless communication system according to one embodiment of the present invention.

FIG. 17 is a diagram for one example of a method of performing a measurement by a UE in a wireless communication system according to one embodiment of the present invention.

Referring to FIG. 17, the UE firstly receives information on subframe sets for the measurement through a higher layer (S1710). Further, the UE receives information on interference measurement resources through the higher layer (S1730). Then, the UE may perform the interference measurement for one subframe set of the subframe sets by using resources within the one subframe set among the interference measurement resources (S1750). Preferably, the interference measurement for the one subframe set is performed under assumption that interferences occurred in the resources within the one subframe set have same attributes.

In this case, the UE may further receive information on channel measurement resources through the higher layer, and perform the channel measurement for the first and second subframe sets by using the channel measurement resources.

Here, the interference measurement resources are defined by a CSI-RS resource element configuration with zero transmission power and a subframe configuration. And, the channel measurement resources are defined by the CSI-RS resource element configuration with non-zero transmission power and the subframe configuration.

More specifically, the CSI-RS resource element configuration with non-zero transmission power indicates CSI-RS resource elements for up to 8 antenna ports. Further, the CSI-RS resource element configuration with the zero transmission power indicates CSI-RS resource elements for 4 antenna ports.

The above-described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of the appended claims and their equivalents or that those claims can be included as new claims by revision after filing an application.

In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other network nodes except the base station. In this case, 'base station' can be replaced by such a terminology as a fixed station, a Node B, an eNode B (eNB), an access point and the like.

Embodiments of the present invention can be implemented using various means. For instance, embodiments of the present invention can be implemented using hardware, firmware, software and/or any combinations thereof. In case of the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Although method of estimating a channel based on CSI-RS (channel status information-reference signal) in a wireless communication system and apparatus therefor are described mainly with reference to examples applied to 3GPP LTE system, as mentioned in the foregoing description, the present invention is applicable to various kinds of wireless communication systems as well as the 3GPP LTE system.

What is claimed is:

1. A method for receiving channel status information-reference signals (CSI-RSs) from a base station (BS) by a user equipment (UE) in a wireless communication system, the method comprising:
    receiving, through a higher layer, configuration about two or more CSI-RSs,
    wherein the configuration includes information about two or more antenna ports on which the two or more CSI-RSs are transmitted from the BS; and
    receiving, from the BS, the two or more CSI-RSs based on the configuration, wherein, based on the configuration including an indicator related to antenna ports of the two or more CSI-RSs, the two or more CSI-RSs are received on the assumption that the two or more antenna ports on which the two or more CSI-RSs are transmitted from the BS are of a same antenna.

2. The method of claim 1, wherein, when the configuration includes the indicator, the two or more antenna ports have a same port index.

3. The method of claim 1, further comprising calculating at least one of a Reference Signal Received Power (RSRP) and a Reference Signal Received Quality (RSRQ) using the two or more CSI-RSs on the assumption that the two or more antenna ports on which the two or more CSI-RSs are transmitted from the BS are of the same antenna, based on the configuration including the indicator.

4. A user equipment (UE) in a wireless communication system, the UE comprising:
a RF (radio frequency) module; and
a processor connected with the RF module,
wherein the processor is configured to:
receive, through a higher layer, configuration about two or more channel status information-reference signals (CSI-RSs), wherein the configuration includes information about antenna ports on which the two or more CSI-RSs are transmitted from a base station (BS), and
receive, from the BS, the two or more CSI-RSs based on the configuration,
wherein, based on the configuration including an indicator related to antenna ports of the two or more CSI-RSs, the two or more CSI-RSs are received on the assumption that the antenna ports on which the two or more CSI-RSs are transmitted from the BS are of a same antenna.

5. The UE of claim 4, wherein, when the configuration includes the indicator, the two or more antenna ports have a same port index.

6. The UE of claim 4, wherein the processor is further configured to calculate at least one of a Reference Signal Received Power (RSRP) and a Reference Signal Received Quality (RSRQ) using the two or more CSI-RSs on the assumption that the two or more antenna ports on which the two or more CSI-RSs are transmitted from the BS are of the same antenna, based on the configuration including the indicator.

* * * * *